United States Patent [19]

Braddick

[11] 4,256,019
[45] Mar. 17, 1981

[54] TURBOCHARGER CONTROL ACTUATOR

[75] Inventor: Peter W. Braddick, Fullerton, Calif.

[73] Assignee: The Garrett Corporation, Los Angeles, Calif.

[21] Appl. No.: 47,841

[22] Filed: Jun. 12, 1979

[51] Int. Cl.³ .......................... F01B 19/00; F16J 3/02
[52] U.S. Cl. .................................... 92/94; 92/98 R; 92/165 R; 92/168
[58] Field of Search ............ 92/167, 94, 98 R, 165 R, 92/168

[56] References Cited

U.S. PATENT DOCUMENTS

| 373,072 | 11/1887 | Jarvis | 92/167 |
|---|---|---|---|
| 380,488 | 4/1888 | Jarvis | 92/167 |
| 2,356,124 | 8/1944 | Stieglitz | |
| 2,374,708 | 5/1945 | Shoults | |
| 3,035,408 | 5/1962 | Silver | 60/602 |
| 3,091,077 | 5/1963 | Erickson | |
| 3,096,614 | 7/1963 | Silver | |
| 3,104,520 | 9/1963 | Cazier | |
| 3,195,805 | 7/1965 | Cholvin | |
| 3,196,606 | 7/1965 | Cholvin | |
| 3,270,495 | 9/1966 | Connor | |
| 3,311,030 | 3/1967 | Halstead | 92/167 |
| 3,389,553 | 6/1968 | Hardy | |
| 3,926,094 | 12/1975 | Kurichh | 92/167 |
| 4,005,578 | 2/1977 | McInerney | 60/602 |
| 4,005,579 | 2/1977 | Lloyd | 60/602 |
| 4,019,323 | 4/1977 | Zuhn | 60/606 |
| 4,075,849 | 2/1978 | Richardson | |
| 4,120,156 | 10/1978 | McInerney | 60/602 |

FOREIGN PATENT DOCUMENTS 1353294  5/1974  United Kingdom .

*Primary Examiner*—Abraham Hershkovitz
*Attorney, Agent, or Firm*—Albert J. Miller; Joel D. Talcott; Stuart O. Lowry

[57] ABSTRACT

A control actuator for a turbocharger comprises a diaphragm-displaced actuator rod projecting outwardly from an actuator housing through a spring-biased retainer which sealably permits axial and angular rod movement for variably positioning a turbocharger wastegate valve.

18 Claims, 4 Drawing Figures

U.S. Patent    Mar. 17, 1981    4,256,019
Fig. 1.
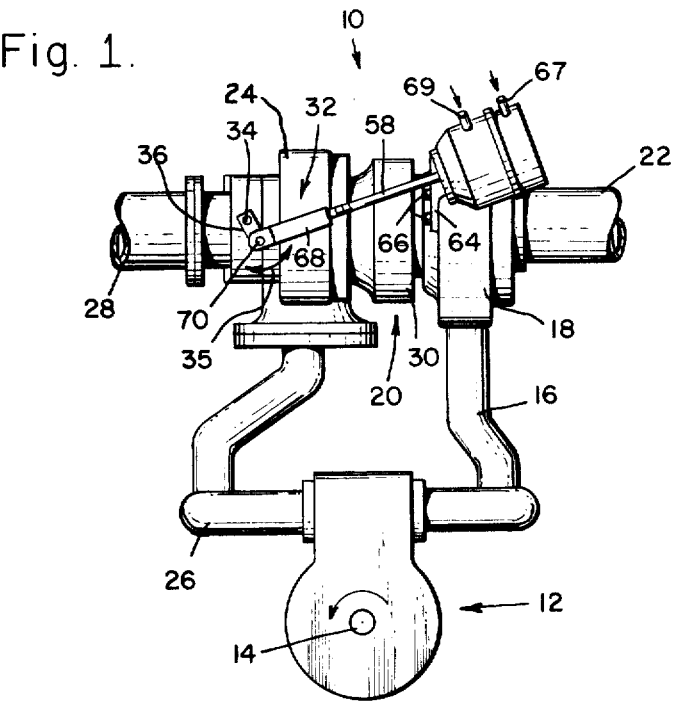
Fig. 2.
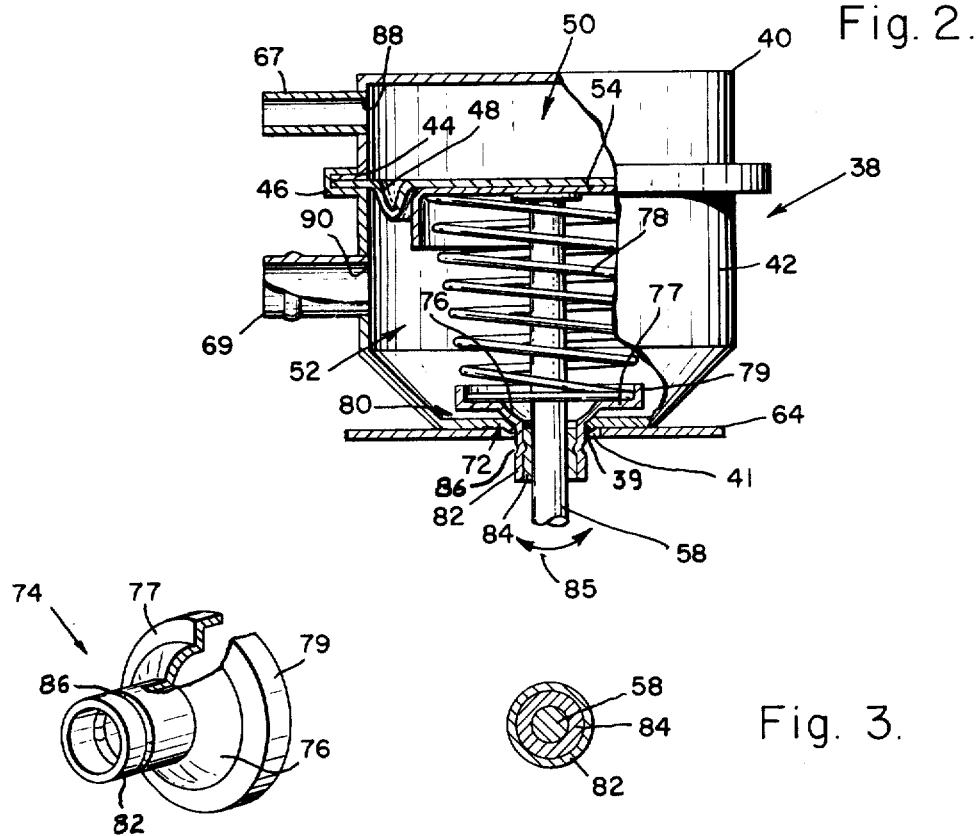
Fig. 4.    Fig. 3.

TURBOCHARGER CONTROL ACTUATOR

BACKGROUND OF THE INVENTION

This invention relates to turbochargers and control devices therefor. More specifically, this invention relates to an improved pressure-responsive actuator for controlling the operation of the turbocharger.

Turbochargers are well known in the prior art, and typically comprise a turbine for driving a compressor to supply relatively high pressure charge air to a combustion engine. The turbine is rotatably driven by exhaust gases from the engine, and in turn rotatably drives a compressor for compressing charge air supplied to the engine. An inherent design problem with turbochargers, however, is that the rotational speed of the turbine and compressor increases as the speed and/or load of the engine increases. At relatively high operating engine speeds or loads, it is possible for the turbine and compressor to be driven at speeds above critical design limits, or for the compressor to supply charge air to the engine at boost pressures higher than the engine can withstand.

A wide variety of control devices for turbochargers have been developed to limit the rotational speed of the turbocharger compressor, and thereby to control the boost pressure level of the charge air supplied by the compressor. Such devices may be mounted either on the compressor or the turbine, and commonly includes blow-off or pop-off valves, turbine bypass or wastegate valves, compressor inlet control valves, and the like. These valve devices are generally similar to each other in principle in that each comprises a valve responsive to a predetermined pressure level or pressure differential to restrict the availability of gases for driving the turbine, or for supply to the engine by the compressor. For example, a turbine wastegate valve operates to close a flow path bypassing the turbine, and may be opened by a pressure-responsive valve actuator to allow a portion of the engine exhaust gases to bypass the turbine to atmosphere. In this manner, the turbine is rotatably driven by a relatively reduced mass flow of exhaust gases to limit the rotational speed of the turbine, and thereby also to limit and control the rotational speed and resultant boost pressure of charge air supplied by the compressor.

Pressure responsive valve actuators typically comprise an actuator housing including a diaphragm dividing the housing into a pair of separate pressure chambers. Inlet ports couple the two pressure chambers to different sources of pressure and/or vacuum to subject the diaphragm to a prescribed pressure differential. Changes in the pressure differential, such as may occur during increases or decreases in engine speed or load, cause displacement of the diaphragm which in turn displaces an actuator rod connected thereto. The rod projects out of the housing, and is connected to an appropriate valve assembly on the turbocharger for positioning a valve to control turbocharger operation.

In practice, one major consideration in the design of pressure-responsive valve actuators is to provide an adequate seal allowing passage of the actuator rod through the actuator housing without significant gas leakage. This is particularly important wherein the pressure sources coupled to the actuator housing comprise gaseous air-fuel mixtures, or wherein the actuator housing is mounted in close association to hot engine components or the turbine of the turbocharger. In this regard, prior art seals which have satisfactory prevented gas leakage typically have restricted displacement of the actuator rod to axial motion only. This type of seal finds its primary application wherein the actuator rod comprises a valve stem connected directly to or formed integrally with a valve head, and wherein axial rod motion is sufficient to properly position the valve head. See, for example, U.S. Pat. Nos. 3,035,408; 3,091,077; 3,104,520; 3,195,805; 3,196,606; 3,270,495; 3,389,553; 4,005,578; 4,005,579; and 4,019,323; all of which relate to valve actuators with valve stems or rods limited to axial motion. However, it is sometimes desirable to use other types of valve structures, such as a relatively inexpensive butterfly valve or the like positionally adjusted by means of a crank arm. With these alternate valve structures, at least some arcuate motion of the actuator rod is required for adjusting the position of the valve. However, with prior art devices wherein the actuator rod is constrained for axial movement only, relatively complex and multiple-link mechanical couplings have been required between the rod and the valve structure for accommodating the desired arcuate movement. See, for example, U.S. Pat. Nos. 2,356,124; 2,374,708; and 3,096,614.

Some attempts in the prior art have been made to provide a relatively inexpensive seal for sealing passage of the actuator rod through a turbocharger actuator housing, while at the same time allowing for at least some arcuate actuator rod movement. However, these prior art designs have related to various flexible or elastomeric seal arrangements, or alternately, to the use of seals formed from relatively exotic materials. See, for example, U.S. patent application Ser. No. 843,392 assigned to the same assignee herein. However, these prior art seals allowing angular movement of the actuator rod have not proven totally satisfactory for long life operation in the high temperature, vibratory environment of turbochargers.

The present invention overcomes the problems and disadvantages of the prior art by providing an improved turbocharger control actuator having an actuator rod projecting outwardly from an actuator housing, and including improved means for sealing passage of the actuator rod through the housing to allow axial and angular movement of the actuator rod with respect to the housing.

SUMMARY OF THE INVENTION

In accordance with the invention, a turbocharger control actuator comprises an actuator housing with an internal diaphragm dividing the housing into a pair of separate pressure chambers. The diaphragm is connected to an actuator rod projecting through one of the chambers and outwardly from the housing for connection to a turbocharger control valve, such as a turbine wastegate valve. The diaphragm and the rod displace in response to variations in pressure differential applied to the diaphragm via ports opening into the pressure chambers for connection of said chambers to a selected pair of pressure sources.

An annular retainer is received about the actuator rod, and coacts with the housing and the rod for sealing passage of the rod through an opening formed in the actuator housing. More specifically, the retainer includes a cylindrical portion having an annular bushing secured therein which slidably and sealingly receives the actuator rod. The retainer cylindrical portion blends into a spherical or bulbular-shaped sealing seat disposed within the rod opening formed in the actuator housing and sealingly seated upon a matingly configured lip formed in said housing. The spherical seat expands radially outwardly within the housing to define a base plate for supporting the lower end of a spring compressively received between the base plate and the diaphragm.

In operation, the spring biases the diaphragm so as to prevent actuator rod movement until the pressure differential applied to the diaphragm exceeds a predetermined threshold. The spring also urges the spherical sealing seat of the retainer into sealing engagement with the housing lip to prevent leakage of gases out of the actuator housing. Importantly, the rod is sealingly movable axially with respect to the bushing, and the retainer sealing seat is pivotal with respect to the housing lip whereby the sealing seat and lip together form a gimbal to accommodate angular deviation of the actuator rod.

BRIEF DESCRIPTION OF THE DRAWINGS

The accompanying drawings illustrate the invention. In such drawings:

FIG. 1 is a schematic illustration of a control actuator of this invention mounted on a turbocharged combustion engine;

FIG. 2 is an enlarged fragmented elevation view of the control actuator;

FIG. 3 is a fragmented horizontal section taken on the line 3—3 of FIG. 2; and

FIG. 4 is a perspective view of a sealing retainer for use with the control actuator.

DETAILED DESCRIPTION OF THE PREFERRED EMBODIMENT

A control actuator 10 of this invention is shown in FIG. 1 mounted on a turbocharged combustion engine 12. The engine 12 is generally conventional in form, and may comprise any of a wide variety of combustion engines such as a reciprocating engine of the type used for automotive vehicles having a driven crankshaft 14 for power output. Intake charge air for the engine 12 is supplied through an intake manifold 16 from a compressor 18 of a turbocharger 20. The compressor 18 draws ambient air through an inlet 22, and compresses the air for supply to the engine. Exhaust gases expelled by the engine are drivingly coupled to a turbine 24 of the turbocharger 20 via an exhaust manifold 26, and are discharged from the turbine 24 through an exhaust conduit 28. In operation, the engine exhaust gases rotatably drive the turbine 24 which, in turn, drives the compressor 18 via a shaft (not shown) carried in an interconnecting center housing 30.

In many turbocharged engines, it is possible for the turbocharger 20 to operate at rotational speeds higher than the turbocharger mechanical components can withstand, or to supply compressed charge air to the engine at boost pressures higher than the engine can withstand. Specifically, at relatively high operating speeds or loads, the mass flow rate of exhaust gases is sufficient to drive the turbine 24 at a rotational speed exceeding turbocharger or engine critical design limits. To prevent damage to the system, as well as to provide system control, control means are provided for preventing the rotational speed of the turbine and the compressor from exceeding a predetermined level, and thereby limit or control the compressor boost pressure.

As shown in FIG. 1, one such control means comprises a wastegate valve assembly 32 mounted on the turbine 24, and including a pivot pin 34 extending outwardly from the turbine 24 and connected to a crank arm 36. Movement of the crank arm 36 through an arcuate path illustrated by arrow 35 with respect to the axis of the pivot pin 34 serves to move an internally mounted wastegate valve (not shown), such as a butterfly or flap valve, to open and close a turbine bypass passage (also not shown). More specifically, the wastegate valve is disposed along an internal bypass passage communicating directly between the exhaust manifold 26 and the exhaust conduit 28 so that a portion of the engine exhaust gases bypasses the rotating turbine when the valve is opened consequently to control turbocharger rotational speed and boost. Importantly, the specific construction of the turbine 24 including the valve assembly 32 and the bypass passage is generally well known in the art, and thereby is not shown or described in detail. However, for a specific example of a representative turbocharger including the turbine, valve assembly, and bypass passage, see U.S. Pat. No. 4,120,156, assigned to the assignee of the present application and incorporated by reference herein.

The control actuator 10 of this invention is shown in more detail in FIGS. 2 and 3. As shown, the actuator 10 comprises a generally cylindrical metal housing 38 formed from complementary upper and lower halves 40 and 42, respectively. The housing halves 40 and 42 are each generally circular in cross section, and include radially outwardly extending flanges 44 and 46, respectively. A circular diaphragm 48 formed from a suitable flexible elastomeric or rubber-based material extends across the housing 38 to divide the housing into two separate chambers 50 and 52. The periphery of the diaphragm is received between the flanges 44 and 46, and is secured in place as by means of the lower flange 46 rolled over the upper outer edge of the upper flange 44.

The diaphragm 48 comprises a performed or convoluted diaphragm carried upon a piston member 54 positioned within the lower chamber 52 of the actuator housing. As shown, the piston member 54 has a diameter less than that of the housing 38 and the diaphragm 48 so as not to interfere with movement of the diaphragm in response to relative pressures in the chambers 50 and 52. The diaphragm is biased upwardly as illustrated in FIG. 2 by a spring 78, the function of which will be described hereafter in more detail. Alternately, if desired, the diaphragm may be conventionally secured to the piston member as by means of opposed retainer plates (not shown) for stiffening the central portion of the diaphragm and for connection to said piston member.

An actuator rod 58 is suitably connected as by welding to the lower face of the piston member 54, as viewed in FIG. 2. The actuator rod 58 extends downwardly from the piston member 54 through the chamber 52, and outwardly from the housing 38 through an opening 39. The lower end of the rod 58 extends further through an opening 41 in a bracket 64 provided for connection of the actuator 10 to the turbocharger 20 by bolts 66 (FIG. 1). The lowermost end of the rod 58 is threadably received in a rod extension 68 which in turn is pivotally connected to the end of the valve assembly crank arm 36 by a pin 70. Accordingly, pressure responsive movement of the diaphragm 48 within the housing 38 displaces the rod 58 to swing the crank arm 36 about the axis of the pin 34, and thereby opens or closes the control valve (not shown) within the turbine 24. Importantly, the crank arm 36 swings through the arcuate path illustrated by arrow 35 in FIG. 1, whereby the actuator rod 58 must be free to move axially and slightly angularly with respect to the housing 38 as indicated by arrow 85 in FIG. 2. Of course, suitable alternate connecting schemes for connecting the actuator rod 58 to the valve assembly 32 may be employed, if desired.

As shown in FIGS. 2–4, sealing means is provided for sealing the passage of the rod 58 through the opening 39 in the housing 38, while at the same time allowing axial and angular movement of the rod with respect to the housing. As shown, the area of the housing 38 circumferentially surrounding the opening 39 is depressed downwardly to form a generally spherically-shaped lip 72. This lip 72 bearingly receives an annular retainer 74 concentrically carried about the rod 58. More specifically, the retainer 74 is formed from a suitable metal material to include a central generally spherical bulbular-shaped sealing seat 76 which matingly seats upon the lip 72 of the housing. This sealing seat 76 blends upwardly into a radially expanded base plate 77 with an outer upstanding rim 79 for receiving and retaining the lower end of the spring 78 compressively carried between the retainer 74 and the piston member 54. In operation, the spring 78 biases the diaphragm 48 as will be hereafter explained in more detail, and springably urges the spherical sealing seat 76 of the retainer 74 into pivotal sealing engagement with the housing lip 72. Conveniently, the spring 78 comprises a conical spring with its narrower end in bearing engagement with the base plate 77 to axially pre-load the retainer 74 without significant cocking or tilting with respect to the housing lip. Importantly, the base plate 77 of the retainer 74 is axially spaced a suitable distance from the lower extent of the housing 38, as indicated by arrow 80, to allow the retainer 74 to shift angularly with respect to the housing lip 72. With this construction, the retainer 74 and housing lip 72 together form a gimbal for accommodating angular deviation of the rod 58 while maintaining a relatively tight gas seal between the retainer and the lip.

The spherical sealing seat 76 of the retainer 74 blends downwardly into a generally cylindrical portion 82 concentrically carried about the actuator rod 58. The cylindrical portion 82 internally carries an annular bushing 84 of a suitable resinous material or the like which is received about the shaft 58 and configured to allow sealed axial motion of the shaft with respect thereto. The bushing 84 is held in position as by crimping indicated at 86 to prevent axial bushing displacement. Accordingly, in operation, sealed axial sliding motion of the rod 58 is allowed with respect to the bushing 84, and angular shifting say through an arc of about 10° as indicated by arrow 85 is accommodated between the retainer sealing seat 76 and the housing lip 72.

In operation, the diaphragm 48 is subjected to a predetermined pressure differential by means of hose fittings 67 and 69 suitably mounted on the housing 38 in alignment with a pair of ports 88 and 90 respectively opening into the chambers 50 and 52. In this manner, a first pressure from one source is applied to the chamber 50, and a second pressure from a second source (which may comprise a vacuum) is applied to the chamber 52 whereby the diaphragm movably responds to variations in the pressure differential applied thereto. Importantly, this pressure differential must exceed a predetermined threshold as governed by the characteristics of the biasing spring 78 before diaphragm movement occurs.

By way of a specific example in one application of the actuator 10, discharge pressure from the compressor 18 or engine intake manifold pressure is supplied to the upper chamber 50 via the fitting 67, and compressor inlet negative pressure is supplied to the lower chamber 52 via the fitting 69. In this manner, during engine operation, substantial positive pressure is applied to the chamber 50, whereas a subatmospheric pressure is applied to the chamber 52. When this pressure differential exceeds the predetermined threshold, the differential urges the diaphragm 48 to shift downwardly and thereby axially displaces the piston member 54 and the actuator rod 58. Any angular motion required to swing the crank arm 36 (FIG. 1) to open or close the control valve within the turbine 24 is accommodated by pivot movement between the sealing seat 76 of the retainer 74 and the housing lip 72. Of course, during such pivoting or shifting motions, the spring 78 springably maintains the retainer 74 in sealing contact with the housing lip 72.

The control actuator of this invention may include a wide variety of modifications and improvements within the scope of the invention. For example, the valve assembly 32 may comprise any of a wide variety of valve assemblies including wastegate, blow-off and pop-off valves or the like. Accordingly, no limitation on the invention set forth herein is intended except by way of the appended claims.

What is claimed is:

1. A turbocharger control actuator comprising a housing; a pressure responsive diaphragm dividing said housing into a pair of chambers; an actuator rod having one end coupled to said diaphragm for movement therewith and extending therefrom out of said housing through an opening formed in said housing; sealing means pivotally received through said opening and including an annular retainer with a sealing seat in pivotally sealing bearing engagement with said housing adjacent said opening for accommodating angular movement of said rod, and a cylindrical portion concentrically received about said rod, and including bushing means concentrically secured within said cylindrical portion and slidably received about said rod for allowing sliding sealed axial movement of said rod; and spring means compressively retained between said diaphragm and said sealing means for predeterminably biasing said diaphragm and for urging said sealing means into pivotally sealing relation with said housing.

2. A turbocharger control actuator as set forth in claim 1 including means for subjecting said diaphragm to a selected pressure differential, said rod being coupled to said diaphragm for movement therewith and extending therefrom through one of said chambers and out of said housing.

3. A turbocharger control actuator as set forth in claim 1 wherein said annular retainer comprises a one-piece retainer having at one end said cylindrical portion concentrically received about said rod, said sealing seat being generally spherical-shaped and in pivotally bearing engagement with said housing adjacent said opening, and at the other end a base plate extending radially outwardly from said sealing seat within said housing.

4. A turbocharger control actuator as set forth in claim 3 wherein said base plate is spaced from said housing to accommodate pivotal movement of said retainer and rod with respect to said housing.

5. A turbocharger control actuator comprising a housing; a pressure responsive diaphragm dividing said housing into a pair of chambers; an actuator rod having one end coupled to said diaphragm for movement therewith and extending therefrom out of said housing through an opening formed in said housing; sealing means comprising an annular retainer including a sealing seat in pivotally bearing engagement with said housing adjacent said opening, and a cylindrical portion concentrically received about said rod; spring means compressively retained between said diaphragm and said retainer for predeterminably biasing said diaphragm and for urging said sealing seat into sealing engagement with said housing to maintain said retainer and housing in pivotally sealing relation; and bushing means concentrically secured within said cylindrical portion and slidably received about said rod for maintaining said retainer and said rod in slidably sealing relation.

6. A turbocharger control actuator as set forth in claim 5 wherein said retainer includes a base plate extending radially outwardly from said sealing seat within said housing for supportively retaining one end of said spring means.

7. A turbocharger control actuator as set forth in claim 1 or 5 wherein said spring means comprises a spring having a generally conical configuration, the narrower end of said spring being in bearing engagement with said sealing means.

8. A turbocharger control actuator as set forth in claim 1 or 5 wherein said sealing seat is formed to have a generally spherical configuration.

9. A turbocharger control actuator as set forth in claim 1 or 5 further including a housing lip formed concentrically about said opening and configured for matingly and sealingly engaging said sealing seat of said retainer.

10. In a turbocharger control actuator having a housing, a pressure responsive diaphragm dividing said housing into a pair of chambers, and an actuator rod coupled to said diaphragm for movement therewith and extending therefrom out of said housing through an opening formed in said housing, a method of sealing the passage of said rod through said opening to allow axial and angular movement of said rod comprising the steps of forming an annular retainer to have a sealing seat and a generally cylindrical portion; positioning said retainer with said sealing seat in pivotally bearing engagement with said housing adjacent said opening, and said cylindrical portion concentrically surrounding said rod; predeterminably biasing said diaphragm and urging said sealing seat into pivotally sealing engagement with said housing with a spring compressively retained between the diaphragm and the retainer; and sealing said cylindrical portion with respect to said rod by securing a bushing within said retainer cylindrical portion and slidably over said rod to allow axial sealed sliding rod movement with respect to said cylindrical portion.

11. The method of claim 10 including the step of forming said retainer to have a base plate extending radially outwardly from said sealing seat within said housing, and including supportively retaining one end of said spring in bearing engagement with said base plate.

12. The method of claim 11 including forming said spring to have a generally conical configuration, and positioning the narrower end of said spring in engagement with said base plate.

13. The method of claim 11 including axially spacing said base plate from said housing to accommodate pivotal movement of said retainer with respect to said housing.

14. The method of claim 10 including forming said retainer to have a generally spherical-shaped sealing seat.

15. The method of claim 14 including forming a lip on said housing about said opening, said positioning step comprising positioning said sealing seat and said lip in mating engagement with each other.

16. A turbocharger control actuator comprising a housing; a diaphragm dividing said housing into a pair of chambers; means for supplying pressure from different sources to said chambers to apply a pressure differential to said diaphragm; an actuator rod having one end coupled to said diaphragm for movement therewith and extending therefrom through one of said chambers and out of said housing through an opening formed in said housing; a one-piece annular retainer having a cylindrical portion concentrically received about said rod, a generally spherical-shaped sealing seat in pivotally bearing engagement with said housing adjacent said opening, and a base plate extending radially outwardly from said sealing seat within said housing; bushing means secured within said cylindrical portion and slidably received about said rod for maintaining said retainer and rod in slidably sealing relation; and spring means compressively retained between said diaphragm and said base plate for predeterminably biasing said diaphragm and for urging said sealing seat into pivotally sealing relation with said housing, said housing including a housing lip formed concentrically about said opening and configured for mating sealing engagement with said seat.

17. In a turbocharger control actuator having a housing, a pressure responsive diaphragm dividing said housing into a pair of chambers, and an actuator rod coupled to said diaphragm for movement therewith and extending therefrom out of said housing through an opening formed in said housing, a method of sealing the passage of said rod through said opening to allow axial and angular movement of said rod comprising the steps of forming an annular retainer to have a generally spherical-shaped sealing seat, a cylindrical portion, and a base plate extending radially outwardly from said sealing seat; forming a lip on said housing about said opening and configured for mating sealing engagement with said retainer sealing seat; positioning said retainer with said sealing seat in pivotally bearing engagement with said housing lip adjacent said opening, said cylindrical portion concentrically surrounding said rod, and said base plate disposed within said housing; springably biasing said diaphragm and urging said sealing seat into pivotally bearing engagement with said housing lip with spring means compressively retained between said diaphragm and said base plate; and sealing said cylindrical portion with respect to said rod by slidably and sealably positioning a bushing on said rod, and securing said bushing within said retainer cylindrical portion.

18. A turbocharger control actuator comprising a housing; a pressure responsive diaphragm dividing said housing into a pair of chambers; an actuator rod having one end coupled to said diaphragm for movement therewith and extending therefrom out of said housing through an opening formed in said housing; sealing means including a one-piece annular retainer having at one end a cylindrical portion concentrically received about said rod, an intermediate portion with a generally spherically-shaped sealing seat in pivotally bearing engagement with said housing adjacent said opening for accommodating angular movement of said rod, and bushing means secured within said cylindrical portion and slidably received about said rod for maintaining said retainer and rod in slidably sealing relation for allowing sealed axial movement of said rod; and spring means compressively retained between said diaphragm and said sealing means for predeterminably biasing said diaphragm and for urging said sealing seat of said sealing means into pivotally sealing relation with said housing.

* * * * *